Jan. 17, 1967 W. SCHILLING 3,299,402
EMERGENCY BLINKING LIGHT SYSTEM FOR AN AUTOMOTIVE VEHICLE
Filed April 28, 1964 3 Sheets-Sheet 3

INVENTOR.
WILHELM SCHILLING
BY
AGENT

United States Patent Office 3,299,402
Patented Jan. 17, 1967

---

3,299,402
EMERGENCY BLINKING LIGHT SYSTEM FOR AN AUTOMOTIVE VEHICLE
Wilhelm Schilling, Obertshausen, near Offenbach (Main), Germany
Filed Apr. 28, 1964, Ser. No. 363,260
Claims priority, application Germany, Apr. 30, 1963, Sch 33,216
3 Claims. (Cl. 340—81)

This invention relates to an emergency blinking light system for an automotive vehicle.

An object of the invention is to provide a control system to cause selective intermittent energization of the directional lights of an automotive vehicle, when desired, whether the ignition switch is energized or not.

Another object of the invention is to provide a control circuit to cause blinking operation of directional lights on the right side and on the left side, front and rear, alternately or simultaneously, when desired, to indicate an unusual or emergency condition.

Another object of the invention is to provide a control system for an automotive vehicle, to establish an emergency blinking system for the directional lights of the vehicle, that shall be independent of the position of the switch for the directional signal indicators.

In case of an emergency situation, when an automotive vehicle cannot move or be moved, and must be left standing where it might be a traffic hazard, it is desirable, in the interest of safety, to call attention to such vehicle and, its condition as a warning to the drivers of other vehicles. A blinking light is effective in attracting attention, and is effective in catching the eye of an approaching driver on the road. Since an automotive vehicle is already equipped with lights that locate the contour of an automotive vehicle, those lights would serve as effective warning signals if they could be controlled for blinking operation during the time of an emergency, when the vehicle must be left standing on a main highway.

The primary object of this invention, therefore, is to provide such a control system, which will cause the turn direction signal lights to operate as blinking lights in an unusual manner that will thereby attract the attention of an oncoming driver and thus avoid a collision.

To accomplish such emergency control of the directional signal lights, a flasher unit such as a transistor multivibrator is energized and adjusted to provide a signal train of about seventy pulses per minute, and those pulses are employed to operate a relay switch to energize the directional signal lights to cause blinking operation.

Figure 1:
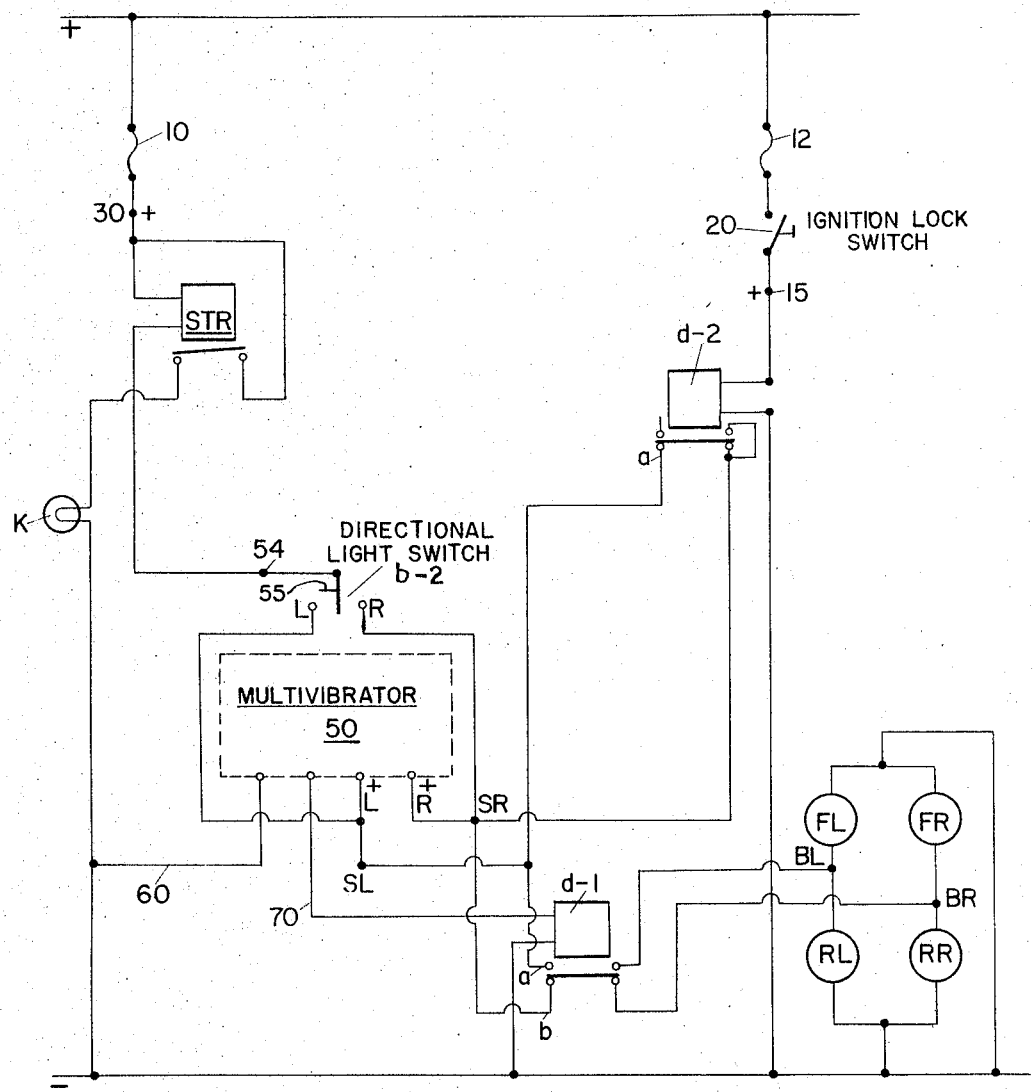
Figure 2:
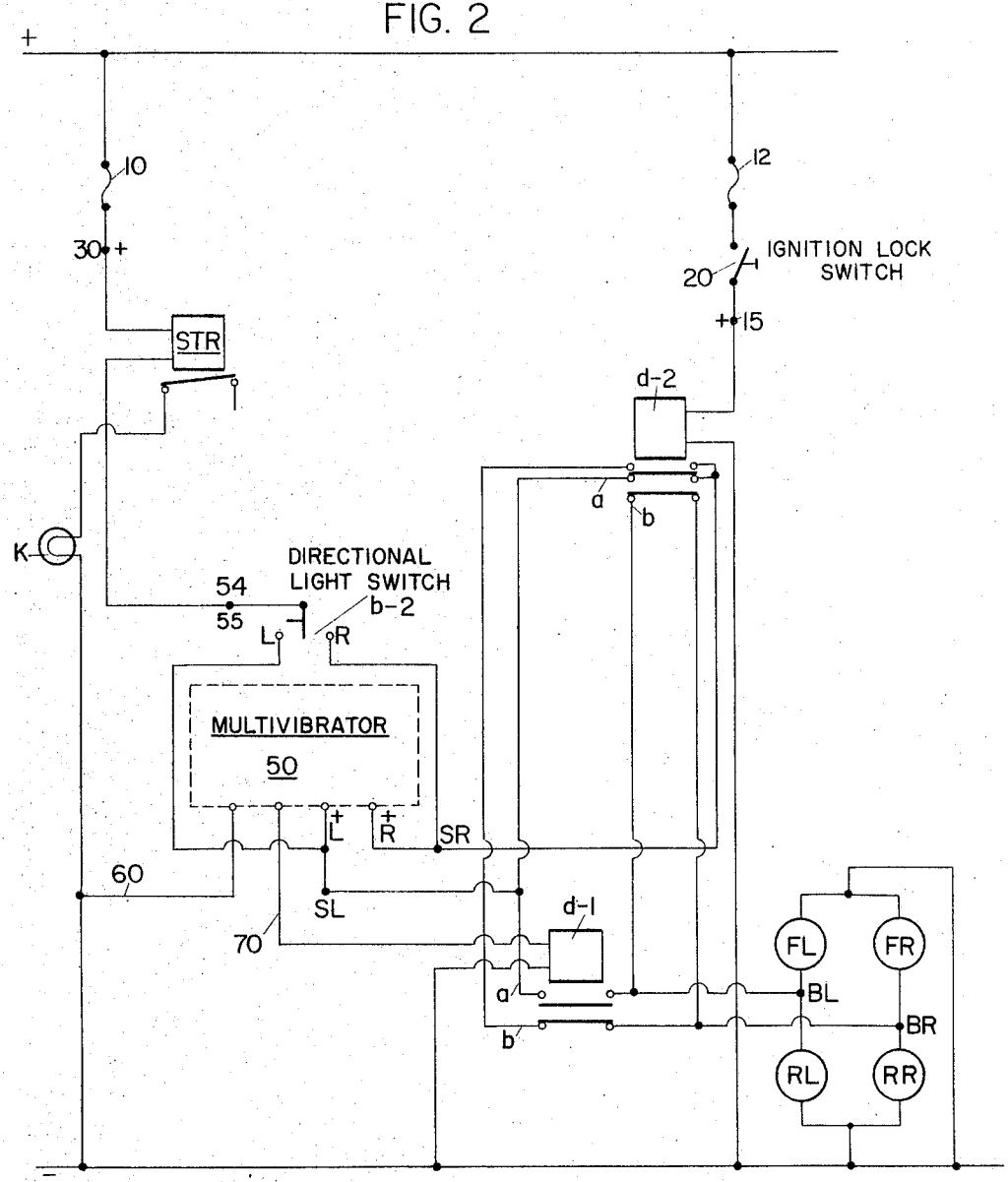
Figure 3:
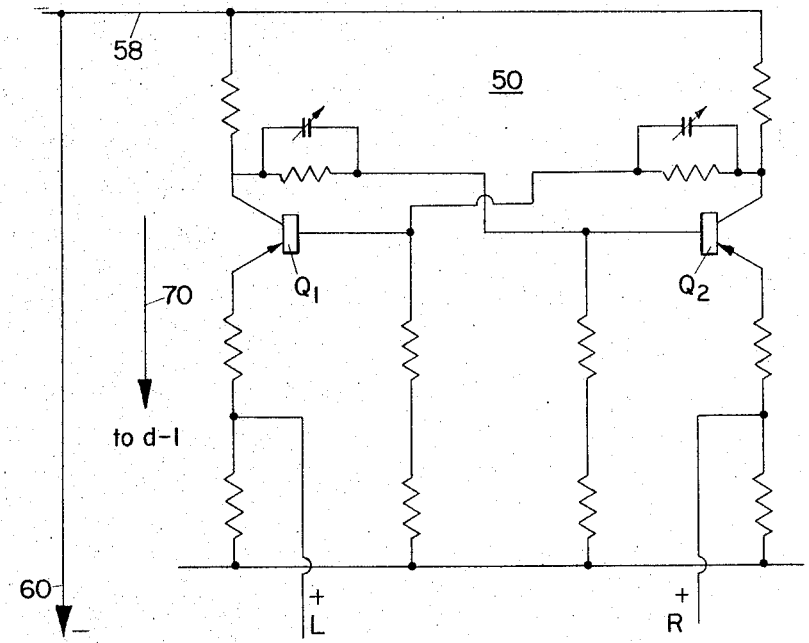

The manner in which the circuitry is arranged and the system functions, is explained in the following specification in connection with the accompanying drawing, in which FIG. 1 is a circuit diagram for a system in which the signal lights are alternately blinked on the respective right and left sides, in sequence;

FIG. 2 is a circuit diagram for a system in which all four signal lights, front and rear, right and left, are simultaneously blinked; and FIG. 3 is a generalized circuit of a multi-vibrator as used herein.

As shown in FIG. 1, the directional lamps, the pilot lamp, the relay coils, and the transistor unit are directly connected to the negative pole of the battery, or ground on the car body. A positive terminal 30 that is connected to the battery through a fuse 10, is connected to a first terminal of the coil of a relay STR and to one contact of a normally open front switch of the relay. A pilot lamp K is connected between the other contact of the front switch of the current relay STR, and ground or negative terminal of battery. The other terminal of the STR relay coil is connected to the central terminal 54 of a directional light switch b–2 which is operated by a handle 55 in the usual manner. A second positive terminal 15 is energized through fuse 12 only when the ignition lock switch 20 is on. Terminal 15 is connected to one coil terminal of the relay d–2.

The second coil terminal of relay d–2 is connected to negative battery. A transistor unit is arranged as a multivibrator circuit 50 and energizes a relay d–1 about 70 times per minute to energize the directional lights for blinking operation.

Assume ignition switch 20 closed. Relay d–2 is energized and attracts its armature. Assume, now, directional light switch b–2 is moved by the handle 55 from neutral or central position toward left position L. Transistor unit is activated at terminal +L by current from plus pole 30 through current relay coil STR and directional light switch b–2 to L, and voltage is applied simultaneously to normally open contact a of relay d–1 and to normally closed contact a of relay d–2. Since relay d–2 is energized, the current path terminates at the normally closed contact a of the relay d–2. The normally open contact a of the relay d–1 is rythmically closed by the pulses from transistor unit 50 on relay coil d–1, and passes the voltage through terminal point BL to the directional front and rear lights FL and RL on the left side, which are thereby rythmically energized in the usual pattern.

When the directional switch b–2 is moved to position R, the device operates in the same manner, but then the normally closed contact b of the relay d–1 leads the voltage to the front and rear directional lights on the right side, FR and RR which are rythmically energized in a second visible pattern.

Assume ignition switch 20 open. Relay d–2 is deenergized and releases its armature to close bottom or back switch a. The directional light switch b–2 is moved either into R or L position. The transistor unit is activated by potential applied from plus pole 30 to terminals +R or +L through the current relay coil and the directional light switch b–2, i.e. through 54 to L, or through 54 to R, and voltage is applied simultaneously to normally open contact a and normally closed contact b of relay d–1, by way of normally closed bottom contact a of relay d–2 with d–2 deenergized. Since one contact a of the relay d–1 is closed by relay d–1 and the other contact b is opened, in pulsed sequence, by pulses from the multivibrator 50, the left and right directional lights are alternatingly energized in a third pattern distinctly different from the two aforementioned patterns, and indicate an abnormal condition to an oncoming driver.

For operation of all four directional lights simultaneously, in yet another distinctive pattern, the circuit is basically the same as described in FIG. 1, but modified as in FIG. 2. A normally closed contact b is added to relay d–2 and is connected across terminals of the contacts a and b in the relay d–1. Moreover, a terminal of the normally closed contact b of relay d–1 is disconnected from the line SR and is connected with normally open contact a of the relay d–2. When the ignition is turned off, and ignition switch 20 open, and relay d–2 is thereby deenergized, all four directional lights are flashed simultaneously by the normally closed contact b of the relay d–2 and the normally open contact a of the relay d–1 in the rythmn set by the pulses from the transistor unit 50. When ignition switch 20 is open, the current path is interrupted at the normally open contact a of relay d–2 connected to the normally closed contact b of relay d–1.

The pilot lamp indicates functioning in all operative modes. If the coil of the current relay STR is traversed by current at full strength, the armature of the relay is attracted and the pilot lamp is energized. If a directional lamp is defective, the current flow in the current relay is too small to attract the current relay armature. The pilot lamp then remains dark and indicates a non-operating condition.

The multi-vibrator 50 is a flasher means utilizing a well-known circuit for generating a train of pulses, and may be variously arranged.

In FIG. 3 is shown a generalized circuit with two transistors Q-1 and Q-2 with appropriate resistors and capacitors as indicated. Detailed description of the multi-vibrator circuitry and operation is not necessary beyond the connections to the external circuitry.

Thus, as shown in FIGS. 1 and 2, the negative bus 58 shown in FIG. 3 is connected to external ground or negative battery through a conductor 60 indicated in FIGS. 1 and 2. The two input terminals L and R to the transistors Q-1 and Q-2 are connected to the respective terminals L and R of the directional light switch b-2. The output as a train of pulses is taken from the collector terminal of either transistor, here Q-1 and is fed through conductor 70 to the coils of relay d-1.

Relay d-1 is thus operated as a vibrator to operate its switches a and b for the blinking operations.

The circuitry may be otherwise arranged without departing from the spirit and scope of the invention as set forth in the claims.

What is claimed is:
1. In a blinking light system for an automotive vehicle having an electric ignition system, in combination:
 (a) a source of electric voltage;
 (b) an ignition switch in circuit with said source and movable between a first position in which said switch is adapted to connect said source with said ignition system for energizing the same, and a second position in which said switch disconnects the source from said system;
 (c) flasher means for generating electrical signal pulses in response to an applied voltage;
 (d) a directional light switch for energizing said flasher light means;
 (e) operating means for moving said directional light switch between a neutral position, a left position, and a right position;
 (f) a left directional light and a right directional light;
 (g) first circuit means connecting said source of voltage to said ignition switch; and
 (h) second circuit means connecting said source of voltage to said directional light switch, to said flasher means, and to said directional lights, the circuit means including
  (1) first relay means having contacts connected to said directional lights, and further having contact means connecting the left position of said directional light switch to said left directional light for applying the pulses generated by said flasher means in a first pattern, and said first relay means having additional contact means connecting the right position of said directional light switch to said right directional light for applying said pulses generated by said flasher means in a second pattern, and
  (2) a second relay means in series circuit with said ignition switch and said source of voltage, the second relay means having contacts connected to be responsive to said second position of said ignition switch, and said second relay contacts connected to both of said right and left positions of said directional light switch for applying said pulses to both said directional lights in a third pattern different from said first and second patterns.

2. In a system as set forth in claim 1, pilot light means in said second circuit means in circuit with said source of voltage and with said flasher means for indicating the generating of said pulses by said flasher means, and another relay means interposed between said source of voltage and said pilot light means.

3. In a system as set forth in claim 1, said flasher means including a transistorized multivibrator circuit.

References Cited by the Examiner
UNITED STATES PATENTS

| | | | |
|---|---|---|---|
| 2,799,786 | 7/1957 | Ellenberger | 340—81 X |
| 2,835,880 | 5/1958 | Daws | 340—81 |
| 2,846,665 | 8/1958 | Hollins | 340—81 |
| 3,002,127 | 9/1961 | Grontkowski | 340—81 X |
| 3,188,623 | 6/1965 | Culbertson | 340—81 X |
| 3,235,837 | 2/1966 | Brown | 340—74 X |

NEIL C. READ, *Primary Examiner.*

I. J. LEVIN, *Assistant Examiner.*